United States Patent [19]

Donahue et al.

[11] 4,040,055
[45] Aug. 2, 1977

[54] DIGITAL COMPENSATOR FOR TRANSMITTER INSTABILITY

[75] Inventors: Thomas H. Donahue; David E. Hammers, both of Los Angeles, Calif.

[73] Assignee: International Telephone and Telegraph Corporation, New York, N.Y.

[21] Appl. No.: 488,726

[22] Filed: July 15, 1974

[51] Int. Cl.[2] .............................................. G01S 9/42
[52] U.S. Cl. ................................... 343/7.7; 343/5 DP
[58] Field of Search .............................. 343/5 DP, 7.7

[56] References Cited

U.S. PATENT DOCUMENTS

| 3,706,989 | 12/1972 | Taylor, Jr. | 343/7.7 |
| 3,742,500 | 6/1973 | Freedman | 343/5 DP |
| 3,745,571 | 7/1973 | Chwastyk et al. | 343/7.7 |
| 3,775,768 | 11/1973 | Lisle et al. | 343/7.7 |
| 3,796,989 | 3/1974 | Ravas et al. | 343/7.7 |
| 3,828,348 | 8/1974 | Murray, Jr. | 343/7.7 |

Primary Examiner—Maynard R. Wilbur
Assistant Examiner—Richard E. Berger
Attorney, Agent, or Firm—William T. O'Neil

[57] ABSTRACT

A digital compensator for radar transmitter instabilities for use in a digital MTI system. The I and Q coherent phase detector outputs are continuously monitored for phase, amplitude and timing instabilities and arithmetic correction signals are generated and applied to the digitized received signal values to compensate for these instabilities which are particularly characteristic of pulsed magnetron transmitters, for example.

6 Claims, 4 Drawing Figures

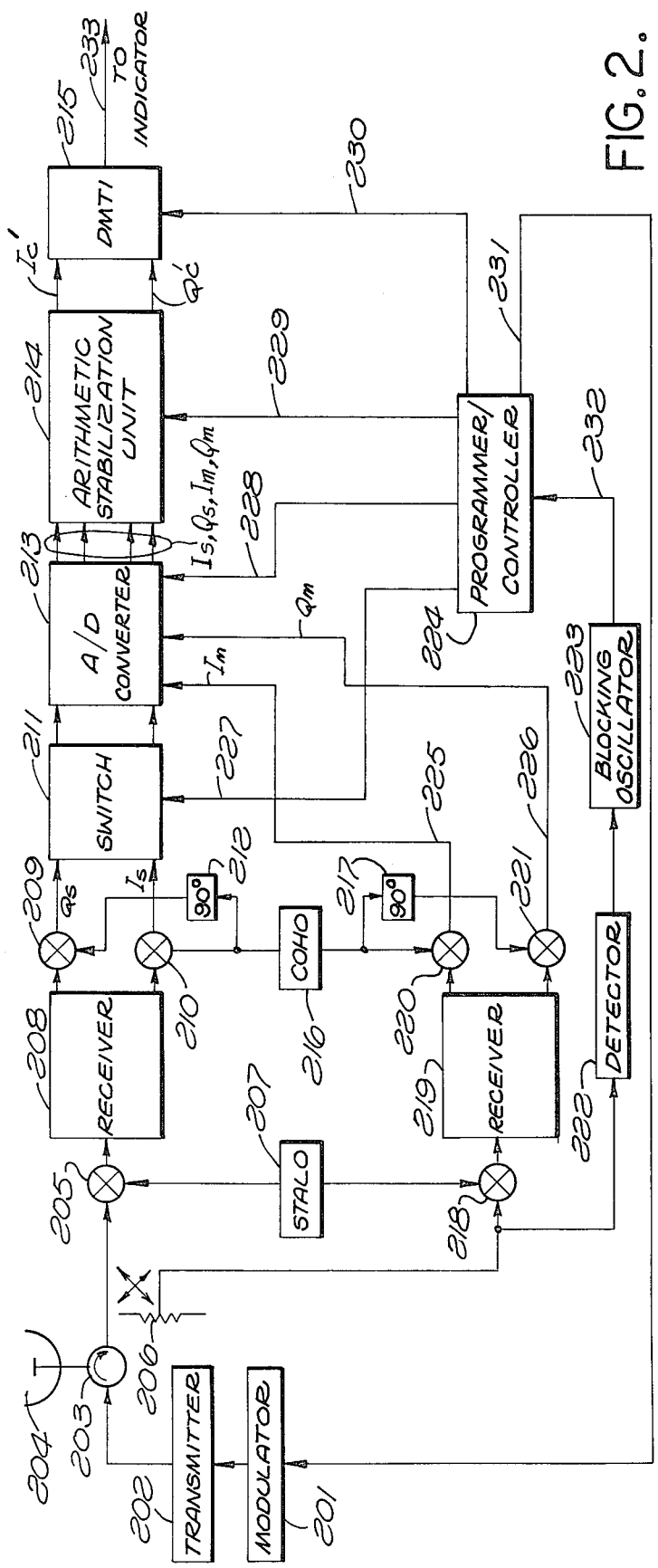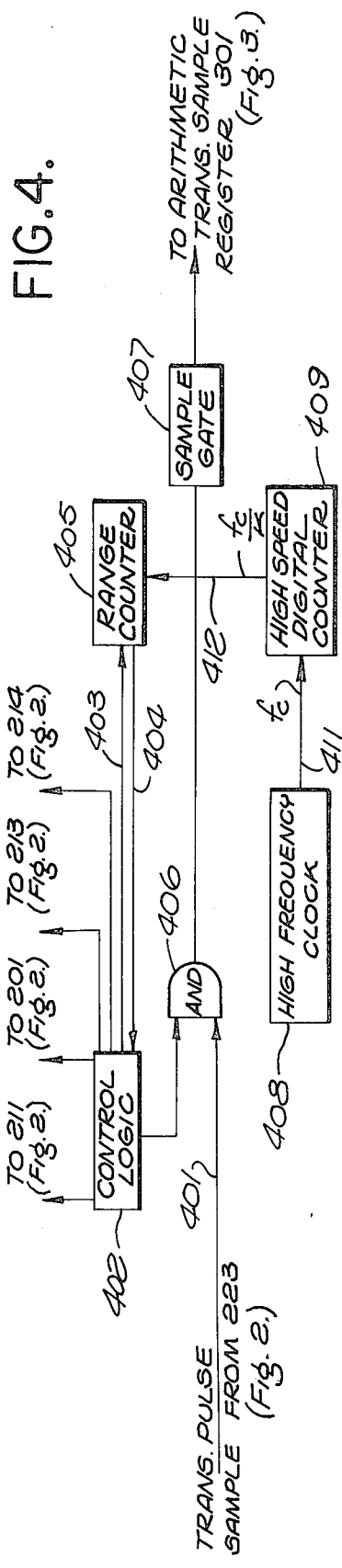

DIGITAL COMPENSATOR FOR TRANSMITTER INSTABILITY

BACKGROUND OF THE INVENTION

1. Field of the Invention

The invention relates to compensation for transmitter instability, generally, and more particularly to pulse microwave transmitters used in MTI systems.

2. Description of the Prior Art

The general subject of moving target indication radar (MTI) is extensively documented in the patent and other technical literature. Chapter 17 of the book "Radar Handbook" by Merrill Skolnik (McGraw-Hill 1970) provides a general background, with bibliography, for a general understanding of the state of this art.

It is generally understood that instabilities including phase and frequency jitter, amplitude-jitter, and pulse-width and timing-jitter, impose limitations on achievable MTI performance due to the separable source of instability set forth in Table 1, taken from the aforementioned "Radar Handbook", as follows:

TABLE 1

| Pulse - pulse instability | INSTABILITY LIMITATIONS Limit on improvement factor |
|---|---|
| Transmitter frequency shift | $1 = 20 \log \left[ \frac{1}{(\pi \Delta f \tau)} \right]$ |
| Transmitter phase shift | $1 = 20 \log \left[ \frac{1}{\Delta \phi} \right]$ |
| Transmitter amplitude jitter | $1 = 20 \log \left[ \frac{A}{\Delta A} \right]$ |
| Transmitter timing jitter | $1 = 20 \log \left[ \frac{\tau}{2 \Delta t \sqrt{B \tau}} \right]$ |
| Transmitter pulse width | $1 = 20 \log \left[ \frac{\tau}{\Delta PW \sqrt{B \tau}} \right]$ | where Δ f = interpulse frequency change
τ = transmitted pulse length
Δ φ = interpulse phase change
A = pulse amplitude, volts
Δ A = interpulse amplitude change
Δ t = time jitter
B τ = time-bandwidth product
(B τ = 1 for uncoded pulses)
Δ PW = pulse-width jitter In a magnetron transmitter for MTI, the most common technique used to achieve phase stability from pulse-to-pulse is the "locked-coho". An example of this technique, as usually implemented, is shown and will be hereinafter briefly described in connection with FIG. 1.

Another potentially useful stabilization approach is offered by "priming" the magnetron with a coherent low-power oscillator. Priming input power of −30 dB with respect to the magnetron output power has been found to be relatively effective in many cases.

Transmitter stabilization may also be achieved by using the "feed-forward" technique wherein the signal to be stabilized is delayed with respect to the error signal (the opposite the "feed-back" technique). Feed forward stabilization is not applicable to a single power oscillator such as a magnetron, but is of potential value in those systems which are completely coherent, i.e., those systems which are composed of a single low level oscillator followed by a chain of power amplifiers. Feed forward stabilization may be of value for those systems using the primed magnetron principle if the priming source is comparatively unstable.

None of the above methods is completely satisfactory however, in that they all require large additional amounts of analog hardware and restrict system dynamic range. The manner in which the device of the present invention deals with the aforementioned problems will be understood as this description proceeds.

SUMMARY OF THE INVENTION

As hereinbefore indicated, one of the major factors which limits, often severely, the achievable MTI performance is transmitter tube instability.

It may be said to be the general object of the present invention to provide digital circuits to compensate for the indicated sources of instability, thereby improving MTI performance.

Quite often the transmitter used in an MTI system is a magnetron. If the canceller is a Digital MTI canceller (DMTI), it is possible to eliminate the coho locking requirement by incorporating an arithmetic stabilization section, which will hereinafter by described in connection with FIG. 2. In addition to correcting for phase instability, amplitude and timing, jitter may also be corrected by using digital compensation. Thus, in principle, the transmitter tube instabilities (except for transmitter pulse width and frequency jitter) may be corrected at a nominal cost, an obvious advantage for MTI systems required to provide high performance. Although the resultant digitally compensated system is not as good as a an all-coherent system (in that second-time-around clutter returns will not cancel), it is relatively easy to implement, and provides a compromise between the conventional prior art "locked-coho" analog system (FIG. 1) and an all coherent system.

It should be emphasized that the digital stabilization techniques developed herein are not limited to the case of the magnetron transmitterbut may be applied to any unstable transmitter — even an all coherent transmitter.

The Digital solution to the transmitter stabilization problem, according to the invention, assumes that the canceller is a DMTI (Digital MTI System). By constantly monitoring the outputs of the secondary I and Q phase detectors when the magnetron fires, sufficient information regarding the relative phase, amplitude, etc., of each magnetron pulse is available for digital computation of these parameters. Knowing the parameter values, the returning signals of interest can be constantly operated on by applying appropriate arithmetic correction factors prior to being fed to the DMTI section proper. This stabilization technique thus involves arithmetic digital stabilization rather than analog stabilization and is applied before cancellation. Since the number and complexity of arithmetic computations required is reasonable, additional digital circuitry requirements are not excessive. The block diagram of FIG. 3 (to be described hereinafter) shows that complete implementation of the Arithmetic Stabilization Section will involve 4 multiplications, 2 squaring operations, 2 divisions and 3 summing operations. Actual division circuits need not be used (since division is a relatively slow process) the division function being readilyachieved by a "table-look up" technique, as is known in the digital arts. Further, if extremely short range coverage can be given up, division need only be performed once per pulse transmission. However, in the foregoing treatment we do not make this assumption.

It will be realized that the primary limitation on the pulse widths which may be handled digitally is the A/D converter requirement to operate at the Nyquist rate or higher. Thus, the sampling strobe must be operated at a 2 MHz rate in order to handle an information bandwidth whose upper limit is 1 MHz (roughly equivalent to a 1 usec pulse). As the radar system pulse width decreases, requirements on the A/D converter become successively more severe. Currently, pulse lengths greater than 0.5 usec can be handled satisfactorily with reasonable hardware cost. Shorter pulses present greater problems and may require (MECCL) logic circuitry; which, although relatively expensive, can be used if the results are warrented.

The ordinary DMTI unit is basically a digital filter. In the event that the magnetron does not fire, the filter will be subjected to a transient. To prevent transients from appearing at the filter output, and thus adding to the residue, a missing pulse detector is utilized. When a missing pulse is detected, the video of the preceding scan will be applied to the filter. Implementation of this technique is shown and will be described as this description proceeds.

To achieve pulse-to-pulse timing jitter correction, the transmitter pulse is fed to a blocking oscillator whose output starts the range clock oscillator in the DMTI.

An alternative, but more complex, technique is to use a chain of extremely fast flip-flop counters to determine the actual elapsed time between the transmitter firing command pulse and the output pulse. Differences in this time are used to offset the range clock oscillator.

The details of implementation of the present invention will be understood from the description hereinafter, taken with the drawings.

BRIEF DESCRIPTION OF THE DRAWINGS

FIG. 2 is a schematic block diagram of a stabilization system applied to a DMTI system in accordance with the present invention.

FIG. 4 is a more detailed block diagram of the programmer/ controller of FIG. 2.

DESCRIPTION OF THE PREFERRED EMBODIMENT

Figure 1:
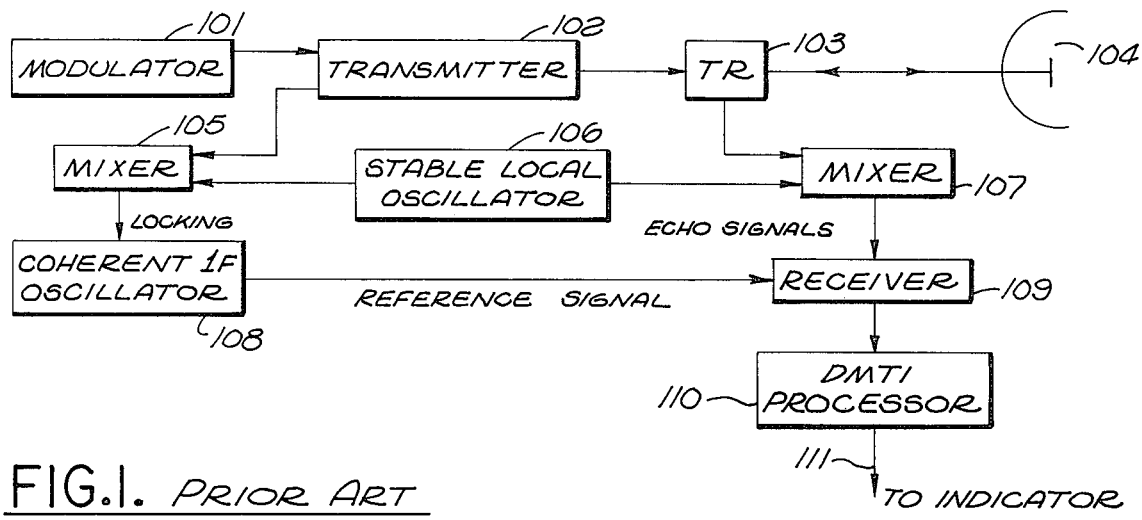
FIG. 1 is a schematic block diagram of a conventional analog stabilization technique, which is prior art in this field.

Referring now to FIG. 1, a basic MTI configuration of the known type is illustrated. In such a device, a radar transmitter 102 (containing a magnetron oscillator, for example) is pulsed by a modulator 101 producing radial frequency pulses which are radiated by antenna and reflector system 104 through the TR (transmit-receive device) 103.

As is well known in this art, the TR 103 effectively prevents the version of any transmitter energy to mixer 107 while the transmitter pulses are extant at the antenna 104, and similarly channels received energy in between transmitted pulses from antenna 104 through TR 103 to the mixer 107 without substantial diversion of energy back toward the transmitter 102. A highly stable local oscillator 106 operates with mixer 107 as the "front end" of the echo signal receiver. A small amount of transmitter energy is diverted to mixer 105 where it is beat against the stable local oscillator signal to produce an IF locking signal, such that coherent IF oscillator 108 is constrained to be phase coherent at the IF frequency, thus, effectively "remembering" the transmitter phase. The output of 108 is provided along with the output of mixer 107 to receiver 109 where the phases of echo signal are effectively compared at IF frequency with the echo signals in the same frequency domain. The receiver 109 would contain a phase detector output such that moving signals at any given nominal range appear as bipolar amplitude modulated signals over a series of pulse intervals. The digital MTI processor 110 may encode the amplitudes in successive "range-bins" and thus identify moving targets vis-a-vis fixed targets, the video output at 111 containing substantially only moving target video.

The so-called DMTI processor may actually be any one of a number of devices extant for the digital processing of signals after coherent detection. U.S. Pat. 3,406,396, to name just one example, describes a device capable of providing the DMTI function.

Before the figures are further described, it will be useful to present the mathematical theory of compensation employed, as follows:

When the magnetron fires, the outputs of the I and Q detectors are:

$$I_m = k_m V_m \cos\phi_m \text{ and}$$
$$Q_m = k_m V_m \sin\phi_m$$

where $\phi_m$ is the phase of the magnetron relative to the phase of the coho.

When a signal from a stationary target returns, we have:

$$I_s = k_s V_m \cos(\phi_s + \phi_m) \text{ and}$$
$$Q_s = k_s V_m \sin(\phi_s + \phi_m)$$

Given the above four relationships, a procedure is first determined for making the signal return independent of the relative phase of the magnetron. This is achieved by using the rotation matrix indicated below, resulting in:

$$\begin{bmatrix} I_{C_1} \\ Q_{C_1} \end{bmatrix} = \begin{bmatrix} I & Q \end{bmatrix} \begin{bmatrix} \cos\phi_m & \sin\phi_m \\ -\sin\phi_m & \cos\phi_m \end{bmatrix}$$

Multiplying both sides of the above by $V_m$, Equations (1) and (2) are obtained, as follows:

$$I_c = I_s I_m + Q_s Q_m \quad \text{Equation (1)}$$

$$Q_c = I_s Q_m - Q_s I_m \quad \text{Equation (2)}$$

where $I_c$ and $Q_c$ are the phase compensated values.

Application of Equations 1 and 2, effectively removes the magnetron phase fluctuations, however, amplitude fluctuations still remain. To remove these amplitude fluctuations, it is sufficient to "normalize" both $I_c$ and $Q_c$ by the square of the magnetron voltage $I_m^2 + Q_m^2$. Thus, the final equations which must be implemented are:

$$I_c = \frac{I_s I_m + Q_s Q_m}{I_m^2 + Q_m^2} \quad \text{Equation (3)}$$

$$\text{and } Q_c = \frac{I_s Q_m - Q_s I_m}{I_m^2 + Q_m^2} \quad \text{Equation (4)}$$

The implementation of these equations is shown in the block diagram of FIG. 3 and will be hereinafter described.

Referring now to FIG. 2, a system will be described in which the DMTI unit 215 comprises a known type of digital MTI canceller. In that instance, it is possible to eliminate the coherent oscillator locking requirement while achieving greatly improved results by incorporating an arithmetic stabilization section 214. This unit 214 performs the function of correcting for phase instability amplitude and timing. Pulse jitter may also be corrected through the employment of digital compensation, to be hereinafter described. Thus, in principle, all transmitter tube instabilities (except for transmitter pulsewidth and frequency jitter) may be corrected. The system depicted in FIG. 2 may be thought of as a compromise between the conventional "lock coho" analog system of FIG. 1 and an all coherent system.

A master synchronizer (programmer-controller) 224 provides clockpulses, synchronizing triggers and control logic as will be explained hereinafter.

The transmitter pulse modulator 201 and transmitter 202 (a magnetron, for example) feed the antenna 204 through a duplexer 203 (illustrated as a circulator). The duplexer 203 operates the same as the TR 103 discussed in connection with FIG. 1; that is, receive signals through antenna 204 are passed to the mixer 205 where they are beat against the stable local oscillator (stalo) 207. Also, while transmitter pulses from 202 are extant, the duplexer 203 also functions to prevent diversion of transmitter energy toward the mixer 205, except that, the directional coupler 206 is arranged to supply a small fraction of the transmitted energy to the mixer 218 and the detector 222 in parallel. The detector 222 and blocking oscillator 223 operating from this point and feeding the programmer/controller 224 comprise the hardware of the so-called pulse-to-pulse timing jitter compensation function along lead 232.

Mixer 205 and 218 feed receivers 208 and 219, respectively, and these in turn, each feed a pair of phase detectors. Phase detectors 209 and 210 receive the respective I and Q outputs of receiver 208. Similarly, phase detectors 220 and 221 receive the I and Q outputs respectively, of receiver 219. The outputs of said 220 and 221 may be characterized as $I_m$ and $Q_m$, respectively, since they represent the direct and quadrature terms derived almost entirely from the magnetron signal. The $I_s$ and $Q_s$ outputs of phase detectors 209 and 210, respectively, represent the substantially continuously flowing received signals through antenna 204, etc.

It will be realized that the 90° phase shifters 212 and 217 each provide a Quadrature coho reference signal, for one of the phase detectors of each of the aforementioned phase detector pairs. The other phase shifter of each pair, as indicated, receives the unmodified signal of the coho (coherent oscillator) 216.

At this point, it may be recalled that the system of the present invention as depicted in FIG. 2 does not require the re-referencing of the coho oscillator 216, in accordance with each transmitter pulse, as would be the case in the prior art system of FIG. 1. Rather, the necessary phase corrections will be seen to be made in the arithmetic stabilization unit 214. It is desirable, of course, that the coherent oscillator 216 be as inherently stable as reasonably possible.

The switch 211 is merely a video switch controlled to pass only the $I_s$ and $Q_s$ signals after the transmitted pulse in each pulse repetition interval has actually occurred and has terminated.

It will be noted that the $I_m$ and $Q_m$ outputs of phase detectors 220 and 221 respectively, are conducted via leads 225 and 226, respectively, to the analog-to-digital converter 213. The $I_s$ and $Q_s$ signals, as they pass through switch 211, are also applied to 213.

In the analog-to-digital converter block 213, both sets of I and Q signals are digitized, that is, a digital value is assigned to the amplitude of signal extant within each successive "range bin", or "range increment" within each pulse repetition interval. Thus, a control trigger on lead 228 from 224 is supplied to define each of these range bins, there being a fairly large number of range bins in each repetition interval.

At this point it would be useful to examine typical frequencies involved in the various triggers and control functions. The rate of the transmitter modulator control trigger on lead 231 would typically be on the order of 1000 to 3000 pulses per second, the duration of a so-called range bin would typically be on the order of 1 microsecond. Accordingly, the trigger pulse rate on lead 228 for the analog-to-digital conversion function will occur at a frequency on the order of 1 MHz. From the A/D converter 213, four outputs representing the $I_s$, $Q_s$, $I_m$ and $Q_m$, are supplied to the arithmetic stabilization unit 214. This unit is supplied with a trigger at the pulse repetition frequency, previously stated to be on the order of 1 to 3 KHz. The function of this trigger on line 229 will be more clearly understood in connection with FIG. 3. The digital MTI processor 215 receives basically two signals, $I_c'$ and $Q_c'$ the I and Q signals having been compensated within the unit 214. The control trigger line 230 may actually involve pulses at the 1 MHz rate corresponding to the range bin rate, as well as at the system PRF. The DMTI unit 215 actually does not, of itself, form a part of the present invention, as hereabove indicated, any of the several types of DMTI units might be employed at 215 providing an MTI video output at 233. This output 233 would either be in digital form or converted within 215 to analog form as a video signal containing only moving target signals. The DMTI unit 215, of course, is basically a digital device which correlates the digital values for a succession of range bins in one pulse repetition interval with those of the next, so that stationary target signals may be cancelled.

Figure 3:
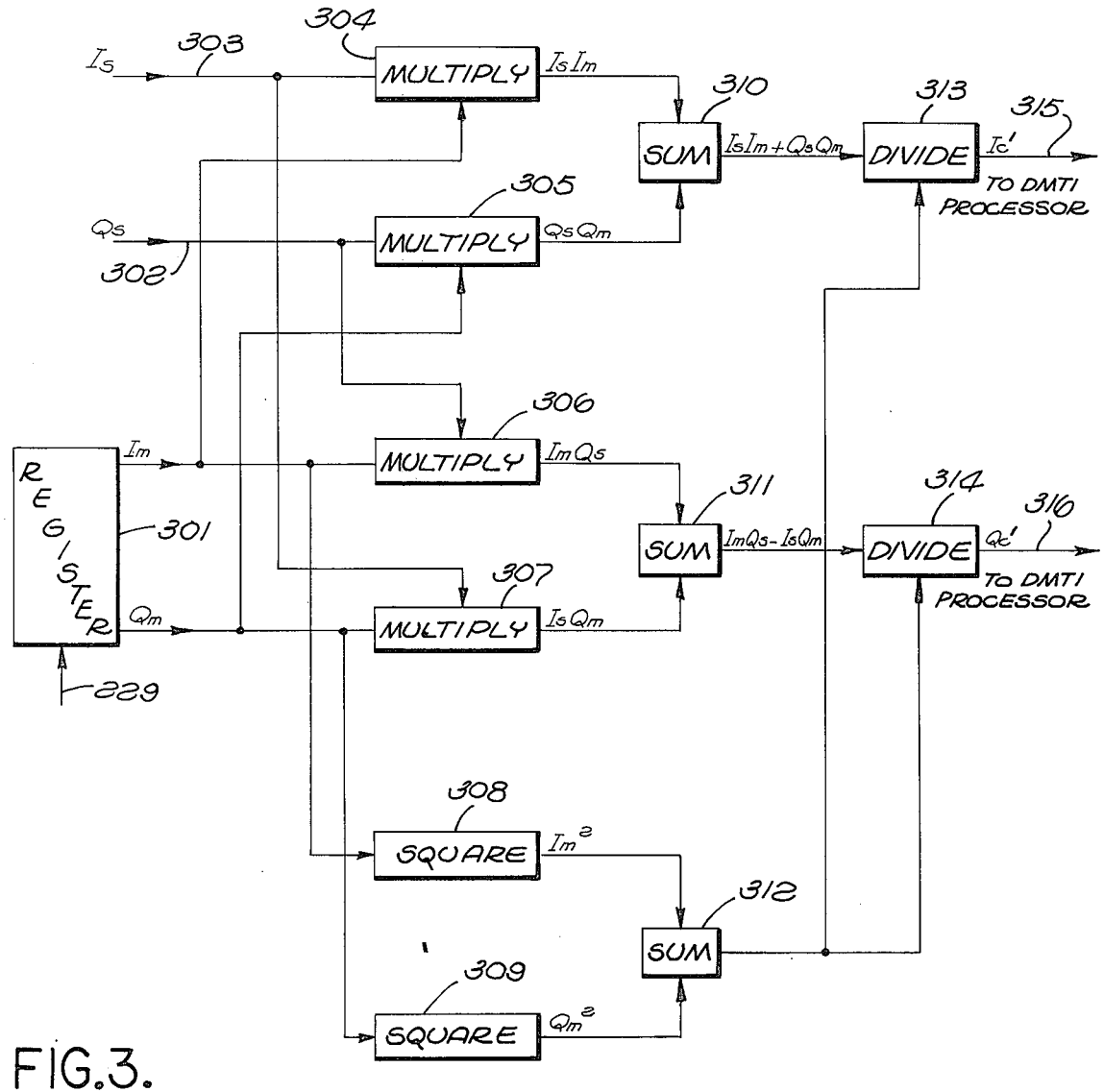
FIG. 3 is a schematic block diagram of an arithmetic stabilization section which comprises a portion of the system of FIG. 2.

Referring now to FIG. 3, the details of the arithmetic stabilization unit 214 are shown and will be described. It is this unit which implements the equations 3 and 4, to produce the compensated I and C values identified as $I_c$ and $Q_c$.

The original data gathering function in respect to each transmitted pulse need only occur once during each pulse repetition interval. Accordingly, a trigger 229 into register 301 is extant at the system pulse repetition frequency. A register 301 accepts the values $I_m$ and $Q_m$ encoded in 213 and essentially holds a set of values throughout the pulse repetition interval. The next trigger on 229 will restore the same type of phase information in respect to a newly transmitted pulse. Inputs 303 and 302, the $I_s$ and $Q_s$ signals respectively, presents the continuously changing return signal history as admitted by the electronic switch 211, (once the transmitted pulse has actually been accomplished) and encoded in 213.

It will be evident from equations 3 and 4 that there are four product terms to be instrumented at the outset.

These are the product terms in the numerators of equations 3 and 4. Taking equation 3 to start and referring to FIG. 3, it will be noted that digital multiplier 304 responds to the two values $I_s$ and $I_m$, producing the product $I_sI_m$ at its output. Multiplier 305 similarly produces the second product in the numerator of equation 3, namely $Q_sQ_m$ at its output. So it is with the numerator product terms of equation 4 in respect to multipliers 307 and 306, as indicated on FIG. 3. Accordingly, the summers 310 and 311 operate to digitally effect addition and subtraction respectively, the output of 310 representing the entire numerator of equation 3 and the output of 311 representing the entire numerator of equation 4. The denominators of both equations being the same, only two squaring circuits 308 and 309 and one summer 312 are required to effect a signal representative of either denominator. Digital dividers 313 and 314 perform the final operation which is to divide numerator by denominator in each of equations 3 and 4, respectively. The result is the $I_c'$ signal at 315 and the $Q_c'$ signal at 316.

Referring back to FIG. 2, utilization of these signals may again be noted in that they are thereafter applied to the digital MTI unit 215. The programmer controller 224 is illustrated in functional schematic block diagram form in FIG. 4. As previously indicated, the elements 222 and 223 of FIG. 2 serve to produce a pulse, timed in accordance with the actual occurrence of the transmitted pulse, so that its time variance may be dealt with. Accordingly, on lead 232, the signal representative of this transmitter pulse in time is admitted to an AND circuit 406 in FIG. 4. A signal at the higher range bin frequency is applied from control logic 402 along line 401 and the AND circuit 406 thereby produces an output in the form of a sample gate 407 along lead 410. This gate is sufficiently long in duration to permit the register 301 of FIG. 3 to "learn" the digitized $I_m$ and $Q_m$ values characteristic of the magnetron performance during each successive transmitter pulse.

As is frequently done, a high frequency clock circuit for 408 is employed, operating for example, in the realm of 500 MHz. It soutput 411 is identified as $f_c$ and operates a high speed digital counter 409 the output of which is $f_{c/k}$. Thus, the signal on 412 is essentially divided down from the high frequency clock $f_c$. This technique is known in the digital arts for producing an accurate and highly repetitive interval $k/f_c$. The control logic 402 and range counter 405 operate in cooperation to produce the multiplicity of trigger and control signals on leads 227, 231, 228, 229 and 230, as indicated.

The instrumentation of FIG. 4 may be greatly varied, of course, and is subject to logical design as a matter of ordinary skill in the digital arts from knowledge of digital instrumention with a priori knowledge of the required functions only.

It may be realized that, the $I_m$ and $Q_m$ terms (equations 3 and 4) could be normalized by the denominators once per transmission, thereby removing the requirement to divide in a one range bin time. A slower operating division algorithm could be applied immediately following a transmission, at the expense of losing coverage over the new range equivalent to the time required to complete the division. Such an approach could be desirable in high resolution systems, as an alternative to the approach particularly described hereinbefore.

Other modifications and variations will suggest themselves to those skilled in these arts, the indicated circuits being typical only. Accordingly, it is not intended that the scope of the present invention should be limited either by this description or by the drawings which are typical and illustrative only.

What is claimed is:

1. A digital MTI radar system including means for transmitting pulses of radio frequency energy comprising:
    a first receiver responsive to echo signals resulting from said transmitted pulses, said first receiver including first and second phase detectors for providing $I_s$ and $Q_s$ signals, where $I_s$ is the in-phase received signal component and $Q_s$ is the quadrature received signal component;
    means for providing samples of said radio frequency energy;
    a second receiver responsive to said samples of radio frequency energy, said second receiver including first and second phase detectors for providing $I_m$ and $Q_m$ signals, where $I_m$ is the in-phase transmitted signal component and $Q_m$ is the quadrature signal component;
    digital conversion means responsive to said first and second receiver outputs to digitize said $I_s$, $Q_s$, $I_m$ and $Q_m$ signals;
    and compensating means responsive to said digital conversion means for generating compensated phase detector signals $I_c$ and $Q_c$, said compensating means including digital arithmetic computing means for solving the equations $I_c = I_s I_m + Q_s Q_m$ and $Q_c = I_s Q_m - Q_s I_m$.

2. A pulsed digital MTI radar system including an antenna, pulsed transmitting means, duplexing means and first and second receivers, and comprising the combination of:
    first means including said duplexer for directing to said first receiver, echo signals received through said antenna following pulse transmissions by said transmitting means;
    second means for directing a small fraction of the radio frequency output of said transmitting means to said second receiver;
    third and fourth means within said first and second receivers, respectively, for separately developing corresponding phase detector outputs $I_s$ and $Q_s$, and $I_m$ and $Q_m$, respectively, said third and fourth means sharing the output of a coherent oscillator to provide a phase reference for said phase detectors;
    fifth means for separately digitizing the outputs $I_s$, $Q_s$, and $I_m$, $Q_m$, of said third and fourth means respectively;
    and sixth means responsive to the output of said fifth means for deriving $I_c'$ and $Q_c'$ as corrected digitized phase detector outputs corresponding to the outputs of the phase detectors of said first receiver, said sixth means providing said $I_c$ and $Q_c$ signals by multiplication and algebraic addition according to the equations $I_c = I_s I_m + Q_s Q_m$ and $Q_c = I_s Q_m - Q_s I_m$.

3. Apparatus according to claim 2 in which seventh means are included within said sixth means for further compensating said $I_c$ and $Q_c$ signals, for transmitting means voltage fluctuations to produce $I_c'$ and $Q_c'$ signals, said sixth means thereby solving the equations $$I_c' = \frac{I_s I_m + Q_s Q_m}{I_m^2 + Q_m^2} \text{ and } Q_c' = \frac{I_s Q_m - Q_s I_m}{I_m^2 + Q_m^2}.$$

4. Apparatus according to claim 3, in which said sixth means includes first, second, third and fourth digital multipliers for obtaining the products $I_s I_m$, $Q_s Q_m$, $I_m Q_s$ and $I_s Q_m$, respectively, a first summer responsive to the outputs of said first and second multiplier, a second summer responsive to the outputs of said third and fourth multipliers for producing the expressions $I_s I_m + Q_s Q_m$ and $I_m Q_s - I_s Q_m$, respectively, first and second squaring circuits for producing $I_m^2$ and $Q_m^2$ terms, a third summer responsive to the outputs of said squarers to produce the expression $I_m^2 = Q_m^2$, a first divider circuit responsive to the outputs of said first and third summers to provide said $I_c'$ as a digital value, and a second divider circuit responsive to the outputs of said second and third summers to produce said $Q_c'$ as a digital value.

5. Apparatus according to claim 3 including control means for gating the operation of said apparatus to recompute said $I_m$ and $Q_m$ for each successive transmitted pulse.

6. Apparatus according to claim 5 including timing control means establishing a plurality of successive range increments within the pulse repetition interval following each transmitted pulse, whereby said fifth means generates discrete digital I and Q values corresponding to the signal amplitude within each of said range increments for each of said successive pulse repetition intervals, and said timing control means is operative to control said sixth means to produce corresponding $I_c'$ and $Q_c'$ values for each of said range increments for each of said successive pulse repetition intervals.

* * * * *